United States Patent [19]

Akiyama et al.

[11] Patent Number: 4,896,182
[45] Date of Patent: Jan. 23, 1990

[54] CAMERA WITH CHANGEABLE FOCAL LENGTH

[75] Inventors: Kazuhiro Akiyama, Saitama; Kazuo Kamata, Tokyo; Hidemi Saito, Yamanashi, all of Japan

[73] Assignees: Fuji Photo Film Co., Ltd.; Nihon Seimitsu Kogyo Kabushikia Kaisha, both of Kanagawa, Japan

[21] Appl. No.: 294,810

[22] Filed: Jan. 9, 1989

[30] Foreign Application Priority Data

Jan. 8, 1988 [JP] Japan .................. 63-863[U]

[51] Int. Cl.$^4$ .................. G03B 7/099; G03B 7/12
[52] U.S. Cl. .................. 354/481; 354/483; 354/199; 354/195.12
[58] Field of Search .................. 354/481, 483, 195.12, 354/195.1, 476, 410

[56] References Cited

U.S. PATENT DOCUMENTS 2,987,977 6/1961 Bretthauer et al. .................. 354/481
3,134,021 5/1964 Ploke .................. 354/481

*Primary Examiner*—L. T. Hix
*Assistant Examiner*—Cassandra Spyrou
*Attorney, Agent, or Firm*—Young & Thompson

[57] ABSTRACT

A camera with a taking lens system changeable in focal length between a relatively long and a relatively short focal length, which has an exposure control meter comprising a masking member disposed in front of a photoelectric element to provide an electric exposure control output, and formed with first and second openings for allowing light that has passed therethrough to fall on the photoelectric element at different incident angles. A light stop member is movable to cover or uncover the second openings upon changing the taking lens system between the relatively long and relatively short focal lengths. Upon changing the taking lens system to the relatively short focal length, the light stop member is moved to uncover all of the first and second openings so as to increase the quantity of light falling on the photoelectric element and to permit that light to fall at an increased incident angle; and, on the other hand, upon shifting the taking lens system to the relatively long focal length, the light stop member is moved back so as to cover only the second opening means while uncovering the first openings, thereby to decrease the quantity of light falling on the photoelectric element and to permit that light to fall only at a decreased incident angle.

10 Claims, 3 Drawing Sheets

CAMERA WITH CHANGEABLE FOCAL LENGTH

BACKGROUND OF THE INVENTION

The present invention relates to a camera of the type having a taking lens system which can be changed suitably for wide-angle photography or telephotography by changing the focal length thereof.

Numerous compact cameras having lens shutters are provided with taking lens systems of the type in which the focal length can be changed between a relatively short focal length of, for example, about 35 mm suitable for wide-angle photography and a relatively long focal length of, for example, 70 mm suitable for telephotography. For changing the focal length of the taking lens system in such a camera, an extra lens, such as a conversion lens, is provided which is displaced from the optical path of the taking lens when the taking lens system is changed to short focal length and, on the other hand, is moved into the optical path simultaneously with the axial movement of the main focusing lens, such as a master or objective lens, of the taking lens when changing to long focal length In many cases, the angle of view and the lens speed (F-number) of the taking lens system will change upon changing the taking lens system between two different focal lengths. It is accordingly necessary to effect exposure control in different ways, depending on whether the lens system is set for wide-angle photography or telephotography.

For different exposure controls, such cameras are equipped with exposure control meters which have a diaphragm or stop member disposed in front of a photoelectric element to changeably control the quantity of light reaching the photoelectric element according to the lens speed of the taking lens system. In addition, such an exposure control meter coacts with an axially movable cylindrical barrel disposed between a light entering window and the photoelectric element to change the angle at which incident light falls on the photoelectric element according to the changed angle of view of the taking lens system.

The provision of such a stop member and an incident angle changing member with their associated elements leads to a complication of the structure of the focal length changeable camera.

OBJECT OF THE INVENTION

It is, therefore, an object of the present invention to provide a camera with changeable focal length, in which an exposure control meter is changed as to the quantity and angle of incident light received thereby conjointly with the change of focal length.

SUMMARY OF THE INVENTION

The above and other objects of the present invention are achieved by providing a camera with a taking lens system changeable in focal length between a relatively long focal length suitable for telephotography and a relatively short focal length suitable for wide-angle photography, comprising a masking member disposed in front of a photoelectric element for receiving light to provide an electric output to control the exposure and having first and second opening means for allowing light passed therethrough to fall on the photoelectric element at different incident angles, and a light stop member movable to cover or uncover the second opening means upon changing the taking lens system between the relatively long and relatively short focal lengths.

In the camera of the present invention, the light stop member is moved to uncover both of the first and second opening means upon changing the taking lens system to the relatively short focal length so as to increase the quantity of light falling on the photoelectric element at an increased incident angle and, on the other hand, to cover only the second opening means while uncovering the first opening means upon shifting the taking lens system to the relatively long focal length so as to decrease the quantity of light falling on the photoelectric element at a decreased incident angle. The change of the quantity of light received by the photoelectric element is effected simultaneously with the change in focal length of the taking lens system, according to the change of lens speed or F-number of the taking lens system, thereby to provide accurate exposure control despite the change in focal length of the taking lens system.

BRIEF DESCRIPTION OF THE DRAWINGS

The above and other objects, features and advantages will become apparent from the following description with reference to the accompanying drawings, in which.

DETAILED DESCRIPTION OF THE INVENTION

Figure 1:
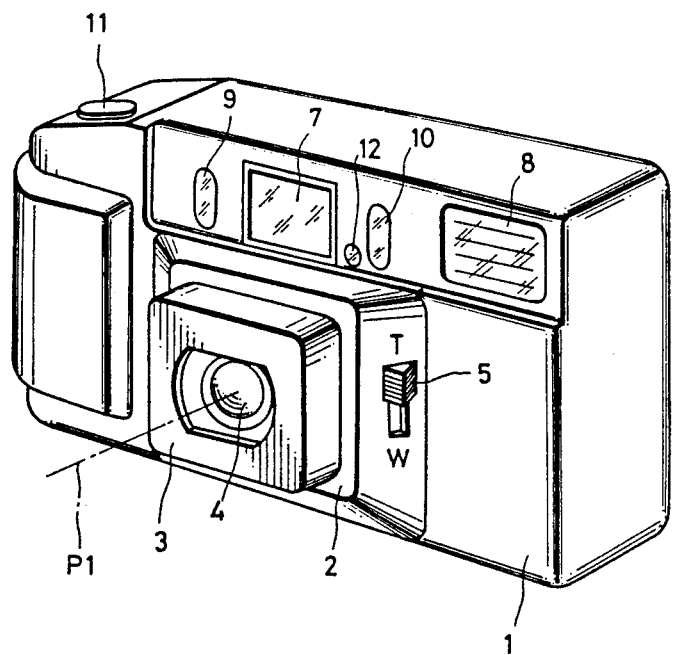
FIG. 1 is a perspective view showing a focal length changeable camera embodying the present invention.

Referring now to the drawings in greater detail, and first to FIG. 1 thereof, there is shown a compact camera embodying the present invention, which has a camera body 1 provided with a fixed lens housing 2. Supported by this lens housing 2 for axial movement is an axially movable lens barrel 3 which supports therein an objective lens 4. This movable lens barrel 3 incorporates therein a mechanical driver actuated upon up or down sliding movement of a photographic mode selecting slider 5 to move barrel 3 back or forth.

The camera body is provided on its front wall, in addition to the photographic mode selecting slider 5 for selectively setting the taking lens system to a wide-angle photographic mode or a telephotographic mode, also with an objective lens 7 of a built-in finder, an electronic flash unit 8 such as a strobe flash, light-projecting means 9 and light-receiving means 10 of an active-type automatic focusing device well known in the art, a light entry window 12 of an exposure control meter, and on its top wall a shutter release button 11. As is well known in the art, the objective lens 4 coacts with a mechanical driver actuated in cooperation with the automatic focusing device to focus on a subject.

Figure 2:
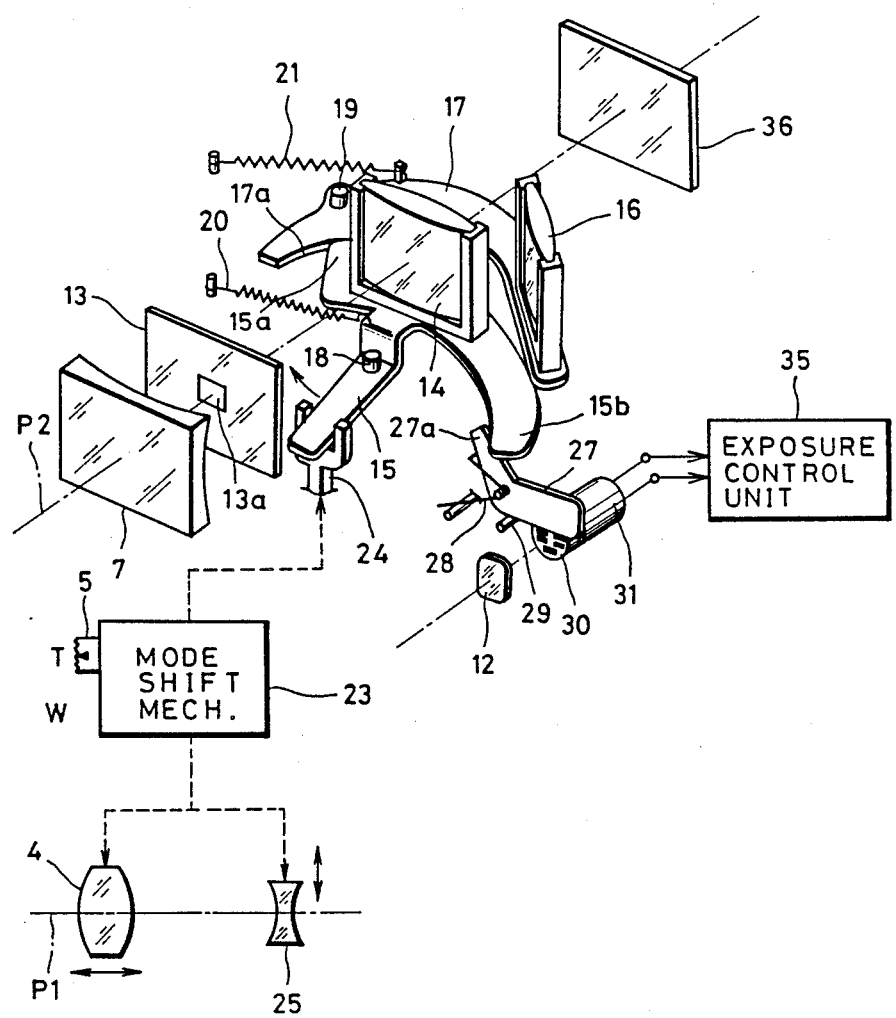
FIG. 2 is a partially diagrammatic exploded perspective view showing the essential parts of the camera of FIG. 1.

Referring now to FIG. 2 showing details of the built-in finder and the exposure control meter, there is a reticle 13 with a target mark 13a disposed behind the objective lens 7 of the finder. Behind the reticle 13, there are first and second eyepiece lenses 14 and 16, one for telephotography and the other for wide-angle photography, alternately movable into the optical path P2 of the finder optical system. The optical system of the finder has a protective glass plate 36 disposed behind the eyepiece lens.

A first lever 15 pivotally mounted on a shaft 18 supports the first eyepiece lens 14 to move it into or out of the optical path P2. A second lever 17 pivotally mounted on a shaft 19 supports the second eyepiece lens 16 to move it into or out of the optical path P2. The first and second levers 15 and 17 are urged or biased in the counterclockwise direction by springs 20 and 21, respectively. The second lever 17 is formed with a cam surface 17a which is engaged with a cam follower arm 15a integrally formed on the first lever 15.

The first lever 15 is engaged by a forked lever 24 actuated conjointly with a photographic mode change mechanism 23 which is well known in the art. This photographic mode change mechanism 23 sets the optical system of the finder to the wide-angle photographic mode or the telephotographic mode when the photographic mode selecting slider 5 is operated. If the photographic mode selecting slider 5 is moved down to a position "W", the conversion lens 25 is displaced from the optical path P1 of the taking lens system to change the taking lens system to short focal length. Simultaneously with the displacement of the conversion lens 25, the photographic mode change mechanism 23 shifts the forked lever 24 in a direction shown by an arrow in FIG. 2 to turn the first lever 15 in the clockwise direction.

The first lever 15 is formed integrally with an arm 15b which is engageable with a tail 27a of a stop plate 27 which is pivotally mounted and is urged or biased in the clockwise direction by a spring 28. The stop plate 27 is disposed between the light entry window 12 and a photoelectric element 31, such as a CdS cell, which has a masking plate 30 of the exposure control meter. When the first eyepiece lens 14 is in the optical path P2, the arm 15b of the first lever 15 is in engagement with the tail 27a of the stop plate 27 to uncover the masking plate 30 of the photoelectric element 31.

Figure 3:
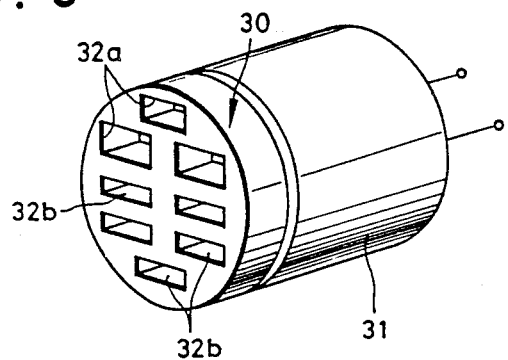
FIG. 3 is an enlarged perspective view showing the masking member in combination with a photoelectric element used in the camera of FIG. 1.

The masking plate 30, which is disposed in front of and close to the photoelectric element 31, is formed with different widths of slots 32a and 32b. As shown in detail in FIGS. 3 and 4, the masking plate 30 has three wider slots 32a formed and distributed in the upper section thereof and five narrower slots 32b formed and distributed in the middle and lower sections thereof. Each wider slot 32a allows light to pass therethrough and reach the photoelectric element 31 at an incident angle $\theta_1$ suitable for wide-angle photography; and, on the other hand, each narrower slot 32b passes light at an incident angle $\theta_2$ suitable for telephotography, which is smaller than the angle $\theta_1$. These incident angles are determined according to the focal lengths or the angles of view between which the taking lens system is changed. It is to be noted that the incident angle depends not only upon the width of slot of the masking plate 30 but also upon the distance between the masking plate 30 and photoelectric element 31 or the thickness of the masking plate 30. Therefore, the width of each slot is preferably determined with regard to the thickness of the masking plate 30 and the distance of the masking plate 30 from the photoelectric element 31. If the masking plate 30 is formed to have different thicknesses as between the upper section and the middle and lower sections, then all the slots 32a and 32b can have the same width but still define different incident angles.

The photoelectric element 31 provides an electrical output proportional to the quantity of incident light falling thereupon, which output in turn is sent to an exposure control unit 35 to control the opening and the open time of a programmed shutter which is well known in the art.

When the camera is in the telephotographic mode or the photographic mode, selecting slider 5 is moved to a position "T" shown in FIG. 2, and the first lever 15 is positioned as shown in FIG. 2 to place the first eyepiece lens 14 in the optical path P2 of the finder optical system, thereby providing a field of view suitably wider for telephotography. The first lever 15 thus positioned brings the arm 15b out of engagement with the tail 27a of the stop plate 27 to permit the stop plate 27 to be turned clockwise by the spring 28 until it is stopped by a detent 29. In this position, the stop plate 27 covers the wider slots 32a in the upper section of the masking plate 30 as shown by solid line in FIG. 4. The photoelectric element 31 can receive light that has passed through only the narrow slots 32b in the middle and lower sections of the masking plate 30.

Since the stop plate 27 thus positioned makes the exposure control meter have a narrowed light measuring angle $\theta_1$ and receive a decreased quantity of light, the photoelectric element 31 is prevented from receiving unnecessary ambient light when the camera is in the telephotographic mode, thereby enabling the exposure control device 35 to perform an accurate exposure control.

Upon moving the photographic mode selecting slider 5 to the position "W" from the position "T", thereby changing the camera into the wide angle photographic mode, the photographic mode change mechanism 23 is actuated to displace the conversion lens 25 from the optical path P1 while moving rearwardly the objective lens 4 to shift the taking lens system into the wide-angle photographic mode. Simultaneously with this mode shift of the taking lens system, the photographic mode change mechanism 23 shifts the forked lever 24 in the direction of the arrow to turn the first lever 15 in the clockwise direction against the action of the spring 20.

The clockwise movement of the first lever 15 permits the second lever 17 to be turned by the spring 21, thanks to the sliding engagement between the cam follower arm 15a of the first lever 15 and the cam surface 17a of the second lever 17. Thus, the first eyepiece lens 14 is replaced by the second eyepiece lens 16 on the optical path P2 to provide a wide angle of view of the finder optical system suitable for wide-angle photography.

Figure 4:
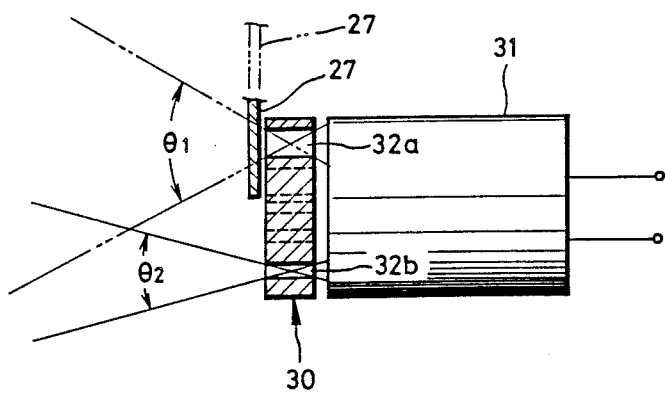
FIG. 4 is a cross-sectional view of the masking member of FIG. 3.

Upon clockwise movement of the first lever 15, the arm 15b of the first lever 15 is brought into engagement with the tail 27a of the stop plate 27 and causes it to turn in the counterclockwise direction against the action of the spring 28, thereby to uncover all of the slots 32a and 32b of the masking plate 30, as shown by a phantom line in FIG. 4. The photoelectric element 31 can then receive light that has passed through all of the slots 32a and 32b of the masking plate 30. Since the stop plate 27 thus positioned causes the exposure control meter to have a widened light measuring angle $\theta_2$ and to receive an increased quantity of light, the photoelectric element 31 can receive light corresponding to an increased lens speed of the taking lens system when the camera is in the wide-angle photographic mode, thereby enabling the exposure control device 35 to perform an accurate exposure control.

Figure 5:
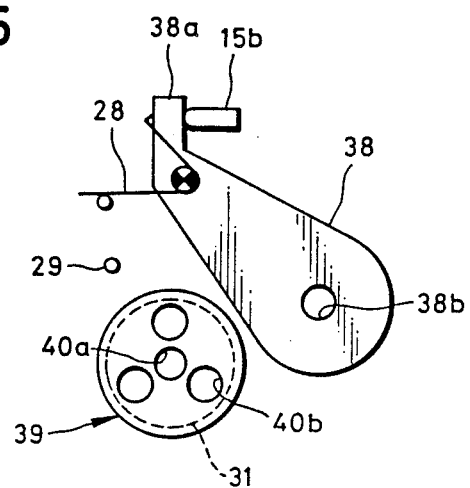
FIG. 5 is a plan view showing an alternative embodiment of the present invention.

Referring now to FIG. 5, there is shown an alternative embodiment of the present invention. It is to be noted that elements not specifically shown or described in this figure are identical to those of the previously described embodiment and so need not be described again. As shown, a pivotally mounted stop plate 38 has a tail 38a which is engageable with the arm 15b of the first lever 15 and is formed with a hole 38b. A masking plate 39 disposed in front of and close to the photoelectric element 31 of the exposure control meter is formed with a center hole 40a having a relatively small diameter for allowing light to pass therethrough at a relatively small incident angle $\theta_2$, and three outer holes 40b located around the center hole 40a at regular angular spacings. These outer holes 40b have a diameter larger than that of the center hole 40a.

If the camera is changed to the wide-angle photographic mode, the first lever 15 brings the arm 15b into engagement with the tail 38a of the stop plate 38 and pushes the stop plate 38 to move to a position shown in FIG. 5, uncovering all of the center and outer holes 40a and 40b of the masking plate 39. The photoelectric element 31 can accordingly receive an increased quantity of light incident at an increased angle $\theta_1$. The exposure control meter effects a light measurement suitably for wide-angle photography.

When the camera is changed to the telephotographic mode by sliding the photographic mode selecting slider 5 to the position "T", the arm 15b of the first lever 15 is moved out of engagement with the tail 38a of the stop plate 38, thereby allowing the stop plate 38 to turn in the clockwise direction under the influence of the spring 28 until stopped by the detent 29. In the position wherein the stop plate 38 is stopped by the stopper pin 29, the hole 38b of plate 38 is in alignment with the center hole 40a of the masking plate 39, but other portions of plate 38 cover all of the outer holes 40b. Thus, the exposure control meter is shifted suitably for telephotography.

In any embodiment described above, it is to be understood that the number of slots or holes formed in the stop plate, namely the total area through which light can enter and reach the photoelectric element, is determined depending upon lens speeds and the angle of view of the taking lens system in the wide-angle and telephotographic modes. Therefore, the number of slots or holes of the masking plate may be changed as long as a predetermined total area is obtained.

It is also to be understood that the stop plate 27, 38 can be operated directly by a member cooperating with the photographic mode change mechanism in place of the arm of the first lever. Furthermore, a zoom lens which is set at at least two different focal lengths may be used as the taking lens.

Although the present invention has been fully described by way of the preferred embodiments thereof with reference with the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera having a taking lens system changeable in focal length between relatively long and relatively short focal lengths, said camera comprising:
   photoelectric means for receiving light and providing an electric output to control exposure;
   a masking member disposed in front of said photoelectric means and formed with first and second opening means for allowing light passing therethrough to fall on said photoelectric means at different incident angles; and
   light stop means movable to cover or uncover said second opening means upon changing said taking lens system between said relatively long and relatively short focal lengths.

2. A camera as defined in claim 1, wherein said light stop means is moved to uncover all of said first and second opening means upon changing said taking lens system to said relatively short focal length and to cover said second opening means while uncovering said first opening means upon shifting said taking lens system to said relatively long focal length.

3. A camera as defined in claim 2, wherein said first and second opening means each comprise a plurality of openings.

4. A camera as defined in claim 3, wherein the opening of said first opening means are distributed in the middle and lower sections of said masking means and the openings of said second opening means are distributed in the upper section of said masking member 5. A camera as defined in claim 3, wherein the openings of said first and second opening means are rectangular slots having different widths.

6. A camera as defined in claim 2, wherein said second opening means is a center hole formed in said masking member and said first opening means comprises a plurality of outer holes formed in said masking member and distributed around said center hole.

7. A camera as defined in claim 6, wherein said center hole has a diameter smaller than that of each said outer hole.

8. A camera as defined in claim 7, wherein said stop member has a hole formed therein which is brought into alignment with said center hole upon covering said second opening means.

9. A camera as defined in claim 1, further comprising a finder optical system having two eyepiece lenses that replace each other upon changing said taking lens system between said relatively short and relatively long focal lengths, said two eyepiece lenses changing said finder optical system as to angle of view between a wide and a narrow view angle.

10. A camera as defined in claim 9, wherein said light stop member is moved upon replacing said two eyepiece lenses one with the other.

* * * * *